(No Model.)
D. M. SOMERS.
Hand Mirror.
No. 236,371. Patented Jan. 4, 1881.
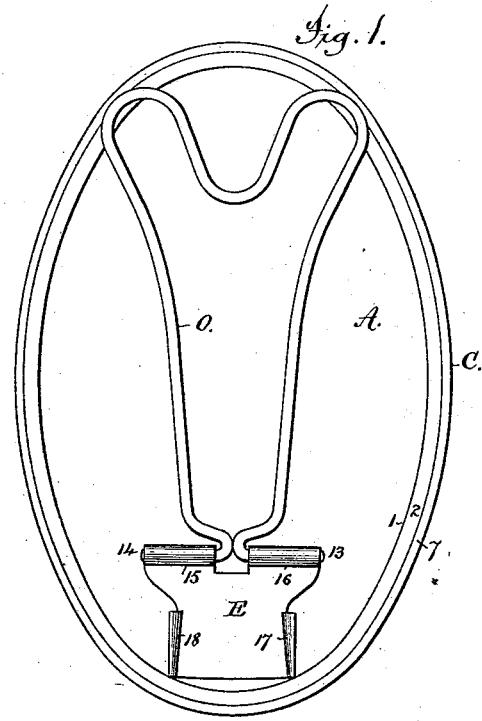
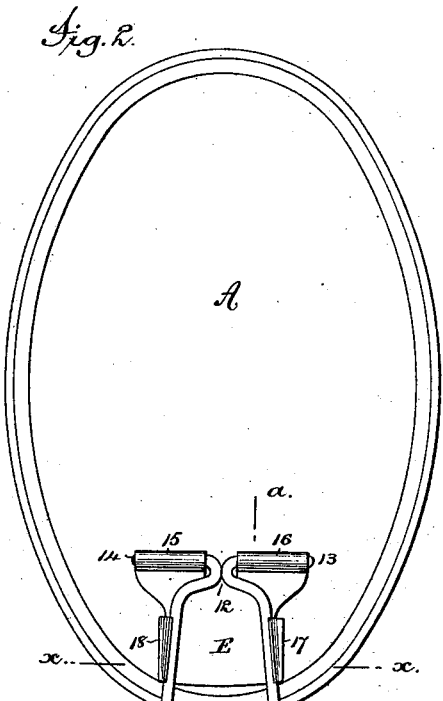
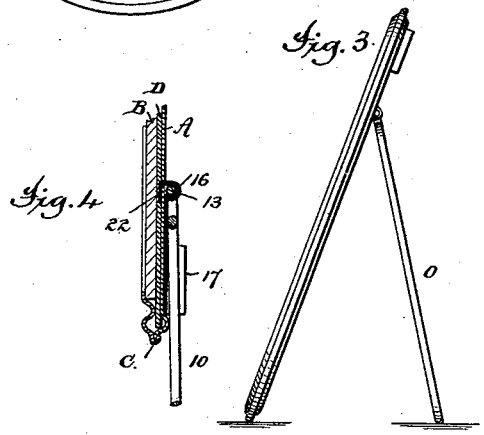
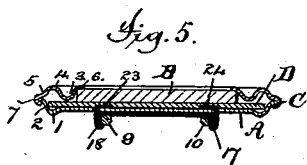
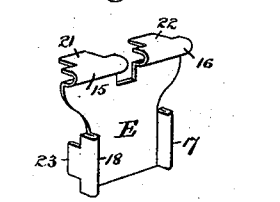
Attest:
Geo. H. Graham
T. H. Palmer
Inventor,
D. M. Somers,
by Munson & Philipp
Attys.

UNITED STATES PATENT OFFICE.

DANIEL M. SOMERS, OF BROOKLYN, ASSIGNOR TO SPELMAN BROTHERS, OF NEW YORK, N. Y.

HAND-MIRROR.

SPECIFICATION forming part of Letters Patent No. 236,371, dated January 4, 1881.

Application filed August 20, 1880. (No model.)

*To all whom it may concern:*

Be it known that I, DANIEL M. SOMERS, a citizen of the United States, residing in the city of Brooklyn, county of Kings, and State of New York, have invented certain new and useful Improvements in Hand-Mirrors, fully described and represented in the following specification and accompanying drawings, forming a part of the same.

This invention relates to the construction of portable or hand mirrors; and it consists more particularly in the structure of the folding handle or support by which the mirror is sustained in position for use, but includes a structure of the frame whereby the glass is secured to the back plate, as will be particularly hereinafter pointed out and claimed. A portable mirror embodying the said invention is illustrated in the accompanying drawings, wherein—

Figure 1 shows the support folded to adapt the mirror for packing; Fig. 2, the support extended its full length for use as a handle, and Fig. 3 the support extended a slight distance from the back to act as a prop. Figs. 4 and 5 show, respectively, sections on the lines *a x* of Fig. 2, and Fig. 6 a perspective view of the clamp for the support.

The silvered glass B, or mirror proper, is held by means of a metallic back plate, A, and a metal rim, C, between which it is clamped. The back plate, A, has a shape approximating that of the mirror, but large enough so that its edge projects beyond the same, which edge is swaged or struck up to provide the outward bend 1 and the inward bend 2. The metallic rim provides a central opening to expose the glass, and is curved or shaped to suit the form of the glass, and it is swaged or struck up so as to provide a bearing-flange, 6, an inward bend, 3, an outward bend, 4, a second inward bend, 5, and a second flange, 7. In putting these parts together the glass is laid upon a sheet of soft packing material, D, placed between it and the metal back A, and the rim C is placed over the whole, so that its flange 6 bears upon the face of the glass B, while its flange 7 overlies and extends beyond the extended edge of the back plate. This flange 7 is then turned over the edge of the back plate, forming the lapped joint illustrated. By this mode of forming the frame-work all of the pressure necessary to upset the metal and secure the rim and back plate together is exerted at a point considerably removed from the glass and upon metallic parts, whereby the danger of breaking the glass is greatly lessened and loss therefrom proportionately removed. The several outward and inward bends of the united edges of the back and rim, furthermore, constitute an elastic clamp, the pressure of which is sufficient to cause the flange 6 to snugly press upon the glass, and thus produce a perfect finish without liability to break the same.

The support O consists of a wire doubled upon itself, so as to provide two members, 9 10, united by a bend, as 11, so as to sustain the members 9 10 far enough apart to constitute a handle or provide a support with a wide bearing-base. The free ends of these members 9 10 are quite abruptly bent inward so as to meet, as at 12, and are then bent outward to form aligned branches 13 14, which enter and swing the sockets 15 16 of a clamping-plate, E, by which the support or handle O is secured to the mirror-frame. This clamping-plate E is formed from a blank of sheet metal cut into proper form and swaged or bent into the shape shown in Fig. 6, whereby it provides the curved sockets 15 16 and the lapped bracing-ledges 17 18 and the fastening-projections 21 22 23 24. It is secured to the back plate, A, before the glass is secured thereto, after the branches 13 14 are inserted in the sockets 15 16, by passing its projections 21 22 23 24 through slits cut through the back plate and turning the projection down into the inner face of the back plate, where it secures the handle or support O to the back plate, so that the same may be swung into the position shown in the drawings. The members 9 10 of the handle or support will, by reason of their peculiar shape, constitute spring-arms that may be bent inwardly to a considerable degree, and thus pass between the ledges 17 18, against which they bear, and by which they are forced inwardly when the handle or support O is swung from the position shown in Fig. 1 to that shown in Fig. 2; and when these spring-arms or members 9 10 are thus forced within the ledges 17 18 their resiliency will cause them to press outwardly, and thus provide a friction sufficient to confine them in that position and afford the necessary resistance to enable the mirror to be properly supported by the handle O in any position in which it may be held. This handle may be readily disengaged from the ledges 17 18 by exerting a proper pressure upon it, and may then be swung into the position shown in Fig. 1, to fold it onto the back A for packing purposes. If desired, this handle O may be placed in the position shown in Fig. 3, to adapt it to support the mirror upon a table in the inclined position shown.

What I claim is—

1. A hand-mirror consisting of a glass, B, a metallic back plate, A, and a metallic rim, C, the edges of which back plate and rim are bent, as set forth, whereby an elastic clamp is formed, the uniting-joint of which is removed a distance from the edge of the glass, substantially as described.

2. The combination, with a mirror-frame having fixed projecting ledges, as 17 18, of a swinging handle or support having spring-arms that are arranged to engage with and be braced by said ledges, substantially as described.

In testimony whereof I have hereunto set my hand in the presence of two subscribing witnesses.

DANIEL M. SOMERS.

Witnesses:
T. H. PALMER,
GEO. H. GRAHAM.